June 10, 1958 H. I. RINGGENBERG 2,838,382
FLUIDIZED CATALYTIC REACTOR
Filed Nov. 15, 1954 2 Sheets-Sheet 1

INVENTOR
HERMAN I. RINGGENBERG
*Adams Howard McLean*
ATTORNEY

June 10, 1958 H. I. RINGGENBERG 2,838,382
FLUIDIZED CATALYTIC REACTOR
Filed Nov. 15, 1954 2 Sheets-Sheet 2

INVENTOR
HERMAN I. RINGGENBERG

BY *Adams Forward & McLean*
ATTORNEY

United States Patent Office 2,838,382
Patented June 10, 1958

2,838,382

FLUIDIZED CATALYTIC REACTOR

Herman I. Ringgenberg, Whiting, Ind., assignor to Sinclair Refining Company, New York, N. Y., a corporation of Maine Application November 15, 1954, Serial No. 468,675

1 Claim. (Cl. 23—288)

This invention relates to the catalytic conversion of petroleum hydrocarbons and more particularly relates to fluid catalytic cracking reactors useful for conversion of petroleum hydrocarbons.

In the common fluid catalytic cracking reactor, an elongated vessel is employed having a section designated as a stripping section and a second major section designated as a cracking section. Conventionally, these sections are superimposed upon one another, the cracking section generally being the upper section. In operation of such conventional reactors, petroleum hydrocarbon fractions are passed into a bed of fluidized cracking catalyst, for example, silica-alumina or similar material, maintained in the cracking section of the reactor at conditions of temperature and pressure conducive to cracking. The effluent separating from the bed of fluidized particles in the upper section of the reactor passes through cyclone separators or other apparatus designed to separate catalyst fines from the cracking effluent and the catalyst fines are returned to the fluidized bed through an extension of the cyclone separator known as a dip leg. During the course of the cracking operation, catalyst is continuously removed from the reactor through a catalyst standpipe located in the bottom portion of the reactor. In normal operation a stripping gas, which may be steam or light hydrocarbon gas such as methane, is passed upwardly through the downwardly descending catalyst particles in the catalyst stripping means so that occluded reaction products are removed from the catalyst particles prior to their introduction into a regeneration zone. The stripped catalyst particles pass downwardly through the catalyst standpipe and are then transferred as a mass of fluidized solids into a suitable regenerator where air or other regeneration gas contacts the particles and burns coke therefrom to effect restoration of the activity of the catalyst. The regenerated catalyst is then returned to the reactor and fed, conventionally, through the catalyst riser into the mass of fluidized catalyst maintained in the reactor.

It can be seen that in the conventional operation of fluid catalytic conversion reactors stripping gas enters into the cracking zone thereby requiring an adjustment of the quantity of hydrocarbon or fluidizing gas fed to the unit to maintain operating conditions. A further characteristic of the conventional operation of these reactors is that fines, normally entrained in effluent from the fluidized bed, upon being separated from the effluent in the cyclone separator are returned directly to the bed. Stripping normally occurs in conventional reactors under the adverse circumstance of a high pressure head and thus stripping frequently may not be satisfactory. A further characteristic of the conventional operation of the reactors is that the products stripped from the catalyst particles in the stripping well are returned directly to the catalyst bed.

By the present invention, I provide a fluid catalyst cracking reactor for the cracking of petroleum hydrocarbons in the presence of a particle cracking catalyst maintained therein as a fluidized bed whereby the stripping medium employed does not enter the cracking zone. My invention further provides a fluid catalyst cracking reactor which in operation is characterized by efficient removal of coked fines from the reactor so that they can be regenerated and returned to the reactor in useful form. My invention also provides a fluid catalyst cracking reactor which facilitates efficient stripping of products occluded to catalyst particles being removed from the reactor for regeneration.

These advantages are obtained by my invention in fluid catalyst cracking reactors by a novel construction of the reactor comprising a centrally located stripping zone extending a material portion of the length of the cracking reactor, a catalyst return dip leg terminating within the stripping zone and a novel arrangement of flow paths in the stripping zone. These advantages will be readily apparent upon consideration of my invention as described in connection with the appended drawings in which.

Figure 1:
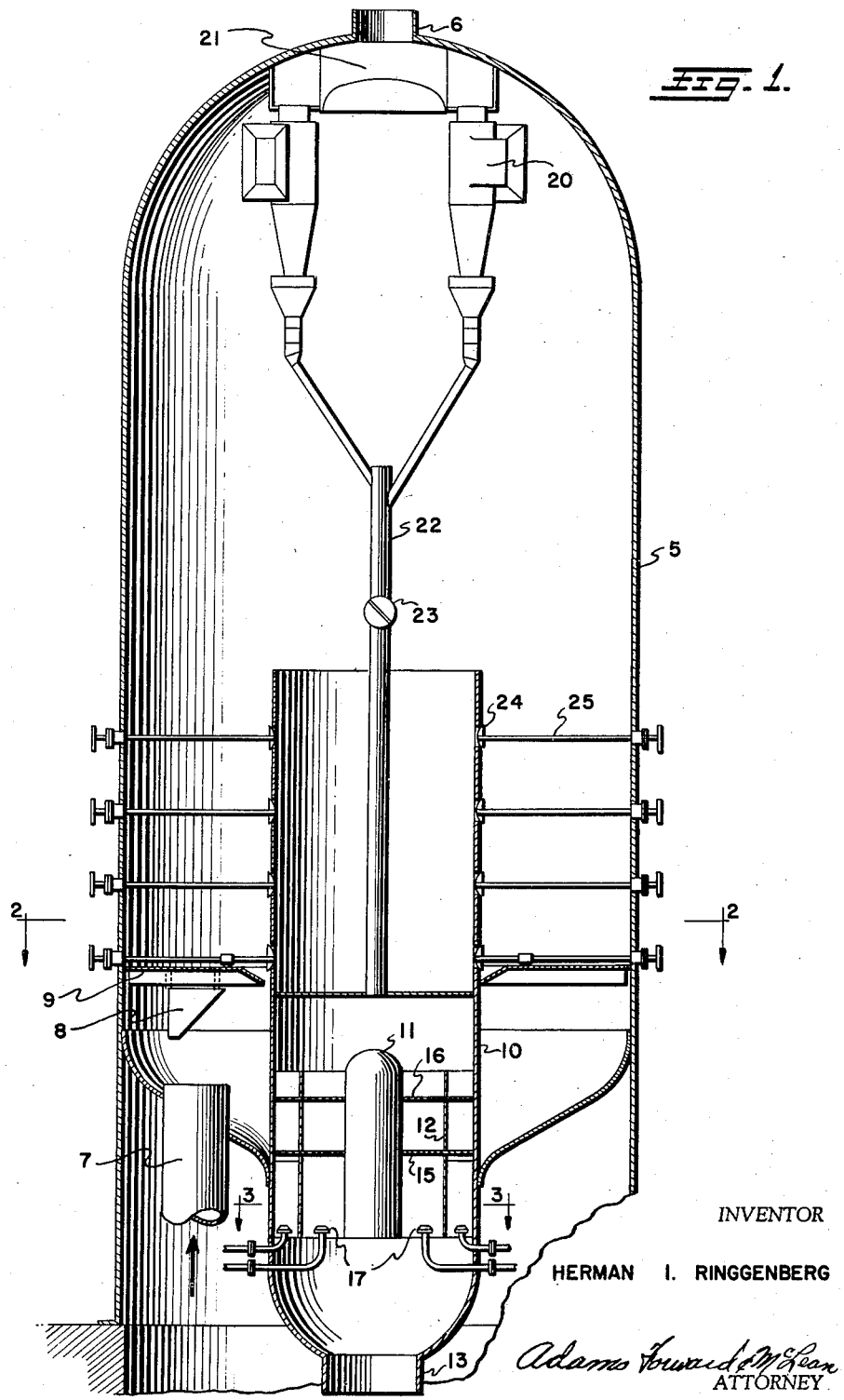
Figure 1 is a vertical elevation of a preferred embodiment of my fluid catalyst cracking reactor.
Figure 2:
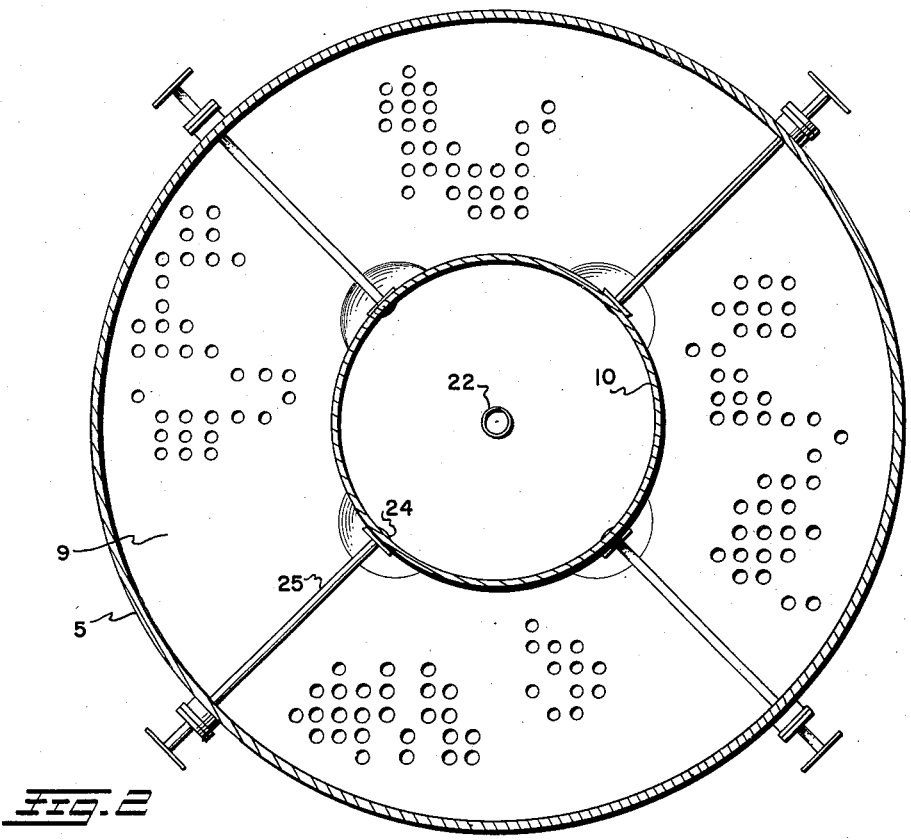
Figure 2 is a horizontal cross-section taken across lines 2—2 of Figure 1.
Figure 3:
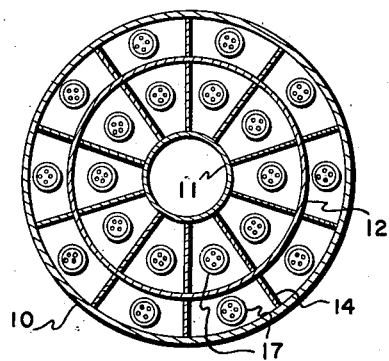
Figure 3 is a horizontal cross-section of the novel stripping portion taken across lines 3—3 of Figure 1.

Referring now to the drawings, my invention in fluid catalyst cracking reactors is composed of a vertically elongated, cylindrically shaped vessel 5 provided with a conduit 6 in its upper end to facilitate removal of effluent products from the reactor. Catalyst enters the vessel 5 through a catalyst riser 7 advantageously comprising a tube. A funnel shaped deflector 8 is placed immediately below a grid 9 which extends across vessel 5 to facilitate in distribution of the catalyst. The grid 9 is a conventional catalyst support and dispersion means designed to provide support for the bed of fluidized catalyst particles during operation of the reactor. Centrally disposed in the lower portion of vessel 5 is a cylindrically shaped member 10 which extends from below vessel 5 into the vessel advantageously to a distance substantially above grid 9, e. g., to a point about 50 percent of the length of vessel 5. Member 10, in general, defines the stripping zone of my novel cracking reactor. Disposed within the lower portion of member 10 is a dummy, closed-ended, cylindrically shaped catalyst deflector which extends upwardly into member 10 to a point below the plane of grid 9. Dummy, cylindrically shaped deflector 11 advantageously is surrounded by a fourth cylindrically shaped member 12 which has a diameter intermediate the diameter of deflector 11 and member 10. Cylindrically shaped member 12 is in open communication at its upper end with the upper portion of the stripping zone defined by member 10 and at its lower end is in open communication with a catalyst discharge port 13 in the lower end of vessel 5. Deflector 11 and member 12 are supportingly spaced from one another and from stripping member 10 by means of a plurality of fin-like supports 14 (refer especially to Figure 3) preferably symmetrically disposed radially about deflector 11 to define paths for catalyst removal from the stripping zone defined by member 10. Advantageously one and preferably two catalyst distribution grids 15 and 16 are placed within member 10 in the area about deflector 11 and member 12. These grids facilitate distribution and dispersion of catalyst passing downwardly through the stripping area defined by fins 14 and the walls of cylindrically-shaped elements 10, 11 and 12. In the lower portion of each of the zones defined by fins 14 and the walls of 10, 11 and 12 is placed a stripping fluid distributing means 17. The use of a separate means in each of the zones to provide stripping medium is advantageous in that it facilitates efficient stripping in view of the division of the stripping area by the fins and cylindrically-shaped elements 10, 11 and 12.

In the upper portion of reactor vessel 5 are placed conventional cyclone separators 20, preferably two in number, to facilitate removal of entrained catalyst particles from effluent product. The cyclone separators 20 communicate with outlet conduit 6 by means of a conventional plenum chamber 21. Catalyst separated from product effluent by means of the cyclone separators 20 is conducted to the stripping section via catalyst dip leg 22. The catalyst dip leg extends into the stripping well defined by member 10 and advantageously terminates at a point below grid 9 directly above the portion of the stripping section defined by fins 14 and members 10, 11 and 12. By this arrangement of stripping zone and catalyst dip leg, it will be observed that fines separated from reactor effluent are removed from the cracking zone and stripped of occluded products whereupon they may be regenerated for subsequent return to the reactor rather than being repeatedly circulated between the cracking bed and the cyclone separators. Catalyst dip leg 22 may be provided with a damper 23 or other flow control means desirably centrally located at a point just outside stripping vessel 10. The damper may be controlled by suitable means (not shown) extending outside the reactor.

In the portion of stripping member 10 extending above grid 9 are a plurality of valve ports 24 externally controlled, for example, by means of rods 25, to facilitate control of the height of fluidized bed maintained in the reactor above grid 9. In normal operation, the valve means 24 on the lowest-level are at least partially open to continuously remove part of the catalyst for regeneration. If the bed of catalyst appears to be extending too high all of the valve ports 24 can be opened, thereby drawing catalyst from the bed into the stripping zone where occluded products are removed and catalyst is withdrawn from the reactor.

In operation of my reactor, catalyst is introduced along with a hydrocarbon fraction, which is to be cracked, through riser 7. Catalyst is forced upwardly by means of a fluidizing gas introduced into riser 7 by means not shown and is dispersed by deflector 8 and passes through grid 9. The fluidizing gas and/or hydrocarbon feed is adjusted to provide a densely fluidized mass of catalyst above grid 9. The quantity of catalyst introduced is adjusted so that the upper level of the bed does not extend past the upper end of member 10. Heat is supplied to maintain optimum conditions of cracking within the bed by any of conventional method; for example, regenerated catalyst can be introduced at a temperature which is higher than the cracking temperature whereby temperature equilibrium is maintained in the bed by absorption of the catalyst heat during the resulting endothermic cracking reaction. Other methods for providing the heat necessary to crack petroleum hydrocarbons, such as the burning of an extraneous fluid and the introduction of the resulting effluent as fluidizing means, are well known and can be employed in my reactor. During the course of the reaction, the lower boiling hydrocarbons produced by the cracking reaction pass upwardly out of the bed of fluidized catalyst and into cyclone separators 20. Entrained in this effluent are the smaller particles of catalyst known as fines; the fines are separated from the product gases by the cyclone separators 20. The product effluent then passes into plenum chamber 21 and thence into exit conduit 6 where it is conducted to condensers, fractionators and the like which are conventional in the art and are not shown.

Catalyst separated in separators 20 is introduced into the stripping section by means of the catalyst dip leg 23. During the course of cracking reaction additional catalyst is introduced into the reactor through riser 7 and a portion of the bed is bled into the stripping section by opening valves 24. By this method of operation maximum activity of the catalyst employed to crack petroleum hydrocarbons is maintained. The deactivated catalyst, along with separated fines, is stripped in the stripping zone of occluded products by passing a stripping medium countercurrent to the downwardly flowing catalyst particles. It may be observed that stripping medium and occluded products exiting from the stripping zone do not enter the cracking zone in my novel reactor. Thus, stripping medium and the stripped products pass upwardly out of stripping member 10 and into the upper portion of vessel 5 where they pass through the cyclone separators and thence out of the reactor by means of conduit 6, where stripping medium can be separated by means of a condenser or other conventional apparatus and recycled, and the separated product gases are recovered.

In operation of stripping section defined by elements 10, 11 and 12 and fins 14, catalyst particles pass downwardly through the plurality of zones so defined. My novel arrangement of the stripping section eliminates channeling and facilitates complete stripping of particles so that loss of reaction products and danger of explosions resulting from the introduction of low boiling hydrocarbons into a regenerator are avoided.

Another feature of the novel stripping section which facilitates efficient stripping is the fact that the quantity of catalyst entering the stripping well can be adjusted in such a manner that a small or limited hydrostatic head is produced in the stripping section. It will be observed that in the event of the introduction of excess catalyst into the stripping well, packing can occur and as the height builds up, a pressure head results whereby catalyst particles moving through the zone containing stripping medium will not be exposed to the medium for a time sufficient to effect efficient stripping.

From the foregoing it will be apparent that this arrangement of a stripping well area within the central part of the reactor is especially advantageous in that fines normally produced during a cracking reaction are efficiently removed from repeated circulation between the cyclones and catalyst bed so that they can be regenerated and reused, stripping of the products occluded to the catalyst is facilitated by the arrangement which limits pressure head in the stripping well, and hydrocarbons undergoing cracking in the cracking zone are not disadvantageously affected by the passage of stripping gas and cracking products into the zone of cracking.

I claim:

A fluid catalytic cracking reactor which comprises a vertical elongated cylindrically-shaped vessel having enclosed upper and lower ends, an outlet in its upper end to permit the exit of product effluent and an outlet in the lower end for catalyst discharge, an elongated cylindrically shaped member of lesser cross section than the vessel and centrally located within the vessel in communication with the catalyst discharge outlet, a grid for supporting a fluid catalyst bed disposed between the vessel and the elongated cylindrically shaped member in the lower portion of the vessel, a catalyst and feed inlet pipe opening into the vessel directly below the catalyst grid, an opening in the wall of said elongated cylindrically shaped member above the grid, valve means in said opening operable from outside the vessel, catalyst deflecting means centrally located within the elongated cylindrically shaped member below the level of the grid which provides a catalyst flow space between the deflecting means and the elongated cylindrically shaped member, separating means extending radially from the catalyst deflecting means defining separate passages for the catalyst flowing downwardly around the deflecting means and through the catalyst discharge outlet of the vessel, means in each of said catalyst passages for injecting catalyst stripping medium, cyclone separator means disposed in the upper part of the vessel, said cyclone separator means having a dip leg for returning catalyst particles to the reaction system which extends into the elongated cylindrically shaped member and terminates at a point below the level of the grid and directly above said catalyst deflecting means.

References Cited in the file of this patent
UNITED STATES PATENTS

| | | |
|---|---|---|
| 2,415,755 | Ogorzaly et al. | Feb. 11, 1947 |
| 2,529,503 | Kimball et al. | Nov. 14, 1950 |
| 2,530,645 | Bockman | Nov. 21, 1951 |
| 2,700,641 | Rehbein | Jan. 25, 1955 |
| 2,728,642 | Cunningham et al. | Dec. 27, 1955 |